United States Patent [19]

Steffler et al.

[11] 4,455,685
[45] Jun. 26, 1984

[54] PARTIAL PRESSURE JERKIN

[75] Inventors: Jean C. Steffler, Downsview; Herman Kaufman, Willowdale; Joseph A. G. Porlier; James A. Firth, both of Toronto, all of Canada

[73] Assignee: Her Majesty the Queen in right of Canada, as represented by the Minister of National Defence, Ottawa, Canada

[21] Appl. No.: 309,507

[22] Filed: Oct. 7, 1981

[30] Foreign Application Priority Data

Dec. 8, 1980 [CA] Canada ............................. 366338

[51] Int. Cl.³ ............................................ A62B 17/00
[52] U.S. Cl. ............................................. 2/2.1 A
[58] Field of Search .................... 2/2.1 A, 2.1 R, 2; 9/20

[56] References Cited

U.S. PATENT DOCUMENTS 2,096,612 10/1937 Freygang ..................... 2/2.1 R
3,243,822 4/1966 Lipkin ............................. 2/2

*Primary Examiner*—Doris L. Troutman
*Attorney, Agent, or Firm*—Stevens, Davis, Miller & Mosher

[57] ABSTRACT

This invention proposes a partial pressure jerkin that includes a front panel and a rear panel to overlie the anterior and posterior region of the trunk respectively of a wearer. The front and rear panels are joined at selected areas of their periphery to provide head, arm and leg apertures. An opening is formed in the rear panel extending from the head aperture to one of the leg apertures to permit access to the garment and a zip fastener is provided to close the opening. A single bladder is attached to the inside of the outer garment and is positioned between the front panel and the chest of the wearer. The bladder extends between the head and arm apertures to terminate in a region adjacent to the shoulder blades of the wearer and covers the anterior portion of the trunk all the way down to the upper thighs and inguinal areas. The bladder is formed from two skins bound together along their peripheral edges and having a dissimilar elastic modulus so that the stretchier inner skin will conform to the contours of the wearer torso and the stiffer outer skin will react to prevent outward ballooning and to direct the compressive forces towards the torso of the wearer upon inflation of the bladder.

14 Claims, 10 Drawing Figures

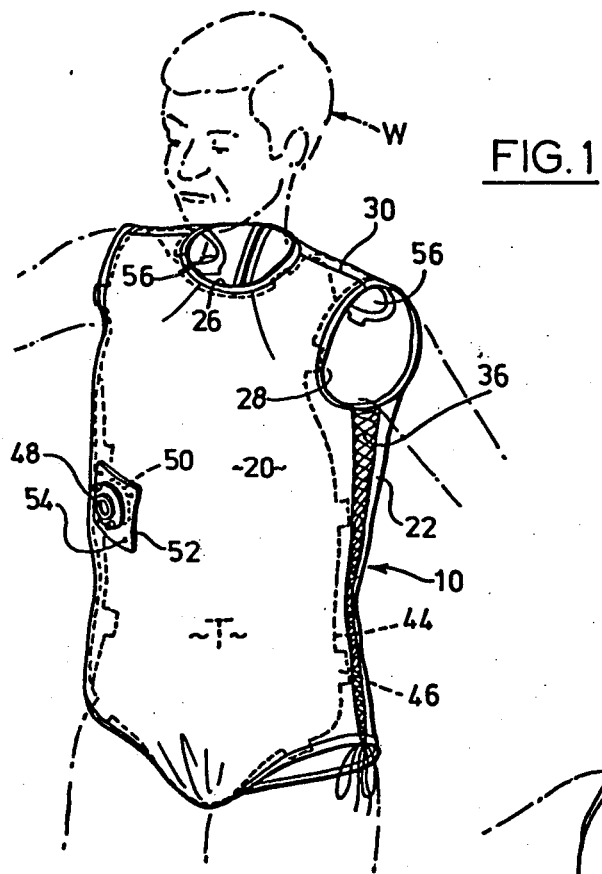

PARTIAL PRESSURE JERKIN

The present invention relates to aircrew protective clothing equipment and in particular to such item of clothing that permits exposure to high altitudes for limited period of time.

Exposure to high altitudes produces certain undesirable effects in man when inadequately protected. One such hazardous effect is a condition known as hypoxia: a general impairment of the mental processes and physiological functions of the body due to a lack of oxygen in the blood resulting from the reduction with altitude in the partial pressure of oxygen in the ambient atmosphere. The degree of hypoxia may be aggravated also by the rate at which an increase or reduction in the partial pressure of oxygen occurs. In military aircraft, physiological protection is afforded by pressurization of the cabin or cockpit and by the use of oxygen enriched air with a content of oxygen up to a contration 100% pure. Certain personal pieces of life support equipment are worn by aircrew to enable them to continue to carry out their duties safely or to descend to a safe lower altitude, in the event of a failure in the cabin pressurization system. The items of equipment which are necessary are related to the maximum altitude to which aircrew may be exposed. At cabin altitudes up to 43,000 feet, hypoxia is prevented by delivering 100% oxygen to the aircrew. At heights above 43,000 feet, the total barometric pressure is insufficient to maintain an adequate partial pressure of oxygen in the lungs even when 100% oxygen is delivered to the respiratory tract. Above these heights, 100% oxygen must be delivered to the respiratory tract under increasing pressure, in order to prevent serious hypoxia. This procedure or technique is known as positive pressure breathing.

Short term protection against hypoxia to altitudes up to 48,000 feet is accomplished by means of an oronasal oxygen mask and a dilution demand oxygen regulator which has the capability of delivering 100% oxygen to the respiratory track under positive pressures up to but not exceeding 30 mm Hg. Above this ceiling, a full pressure suit or a partial pressure suit system is required depending on the type of mission to be flown. Full pressure suits have been designed to provide adequate protection against hypoxia at any altitudes and for extended period of time, as shown in the space flights and moon programs. However, full pressure suits are not practical for use in daily routine flight because they are excessively expensive and require extensive elaborate maintenance by a specialized team of highly skilled technicians. On the other hand, partial pressure suits or jerkins and oxygen systems have been developed to provide adequate protection against hypoxia at high altitudes for period of time sufficient to allow emergency descent to a safe lower altitude below 43,000 feet. This latter approach necessitates the delivery of 100% oxygen to the respiratory tract at positive pressures above 30 mm Hg.

The simplest manner in which positive pressure breathing is performed is by means of an oronasal oxygen mask which is capable of holding the dictated breathing pressures without leakage of oxygen between the mask and the face of the wearer. However, the effect of delivering oxygen to the respiratory tract under high pressures is to overdistend the lungs. It has been reported that the maximum positive breathing pressure which may be used over a limited period of time without external support to the chest is 30 mm Hg. Excessive breathing difficulties associated with higher levels of positive breathing pressures can be alleviated by the application of counter-pressure to the external surface of the thorax. This becomes absolutely necessary at breathing pressures in excess of 30 mm Hg. A method by which this may be accomplished is by enclosing the trunk with a large bladder or inflatable system, i.e. a partial pressure jerkin which is connected to the breathing line between the dilution demand oxygen regulator and the oronasal mask.

A main adverse effect of positive pressure breathing is to produce a proportional increase in the intrapulmonary pressure which is transmitted to the circulatory system, thereby causing displacement of the blood from within the thorax into the abdomen and limbs. This reduction in the effective central blood volume places a severe stress upon the circulatory system and when the reduction exceeds a certain level, circulatory collapse and unconsciousness will occur. An additional decrease in the central blood volume during pressure breathing results from the loss of fluid from the circulation due to an increase in the capillary pressure. The peripheral pooling of blood and the loss of circulatory fluid can be minimized by applying adequate counter-pressure to the body. The application of counter-pressure to the abdomen and to the lower limbs will give a correspondingly greater degree of protection against the adverse circulatory and cardiovascular disturbances induced by positive pressure breathing. In practice a pair of anti-G pants is employed to apply counter-pressure to the abdomen and to the lower limbs in order to inhibit pooling of blood and to permit pressure breathing with the aid of a partial pressure jerkin. A number of partial pressure jerkins have been proposed to facilitate positive pressure breathing. One partial pressure jerkin in particular employs a bladder which embraces the full torso in conjunction with a pair of anti-G pants and an oronasal oxygen mask. Experimental studies have shown that this partial pressure jerkin provides the best degree of protection against the adverse cardiovascular effects produced by positive pressure breathing and against hypoxia at altitudes above 48,000 feet. The main drawbacks with this partial pressure jerkin are bulkiness (inflated and uninflated), weight (4 lb. 6 oz.), high thermal load and reduced wearer mobility.

In an attempt to overcome these disadvantages, another partial pressure jerkin was proposed which utilized a bladder limited to the diaphragm area of the thorax. Whilst such a partial pressure jerkin was found to be lighter and more comfortable, it was clearly demonstrated that the physiological protection it afforded against high levels of positive pressure breathing was significantly inferior to the previously described partial pressure jerkin.

A further problem associated with the two prior partial pressure jerkins is that the support offered by the inflated bladder is discontinuous in the area of the chest where maximum support is required.

Therefore, the prime objective of the present invention is to produce a new partial pressure jerkin which obviates or mitigates the above shortcomings, while providing an adequate degree of protection against the cardiovascular disturbances caused by positive pressure breathing.

According to one aspect of the present invention there is provided a partial pressure jerkin comprising an outer garment having a front panel to overlie anterior portion of a torso, and a rear panel connected to said front panel and arranged to overlie the posterior portion of a torso, head and arm apertures formed in said garmet between said front and rear panels, a bladder located within said garmet and underlying at least a portion of said front panel, connection means to connect said bladder to a pressurised source, an opening in said rear panel to permit said garment to be placed on said torso and fastening means to secure said opening whereby said bladder may extend in uninterrupted manner across said front panel.

According to a further aspect of the present invention there is provided a partial pressure jerkin comprising an outer garment to encompass the torso of a wearer and including head and arm apertures, an inflatable bladder located within said garment, and connection means to connect said bladder to a source of pressurised fluid to inflate said bladder and exert a compressive force on said torso, said bladder being located within said garment to overlie the anterior portion of said torso, including the upper thighs and inguinal areas and having a pair of lateral extensions extending across a shoulder portion between said head and arm apertures and terminating in the proximity of the shoulder blade of said torso.

According also to the present invention there is provided for use in a partial pressure jerkin including an outer garment to encompass a torso, an inflatable bladder for location between said garment and said torso to exert a compressive force on said torso upon inflation, said bladder including an outer skin engageable with said garment, an inner skin engageable with said torso, said inner and outer skins being sealed to one another along their peripheral edges and inlet means to permit ingress of pressurised fluid between said skins, said inner skin having a lower modulus of elasticity than said outer skin whereby, upon inflation of said bladder, said inner skin stretches to conform to said torso and provide uniform support thereto.

Embodiments of the invention will now be described by way of example only with reference to the accompanying drawings in which:

FIG. 1 is a front perspective view of the proposed partial pressure jerkin with the wearer indicated in ghosted lines.

FIG. 2 is a rear perspective view of the proposed partial pressure jerkin.

FIG. 3 is a side elevation of the proposed pressure jerkin.

Figure 4:
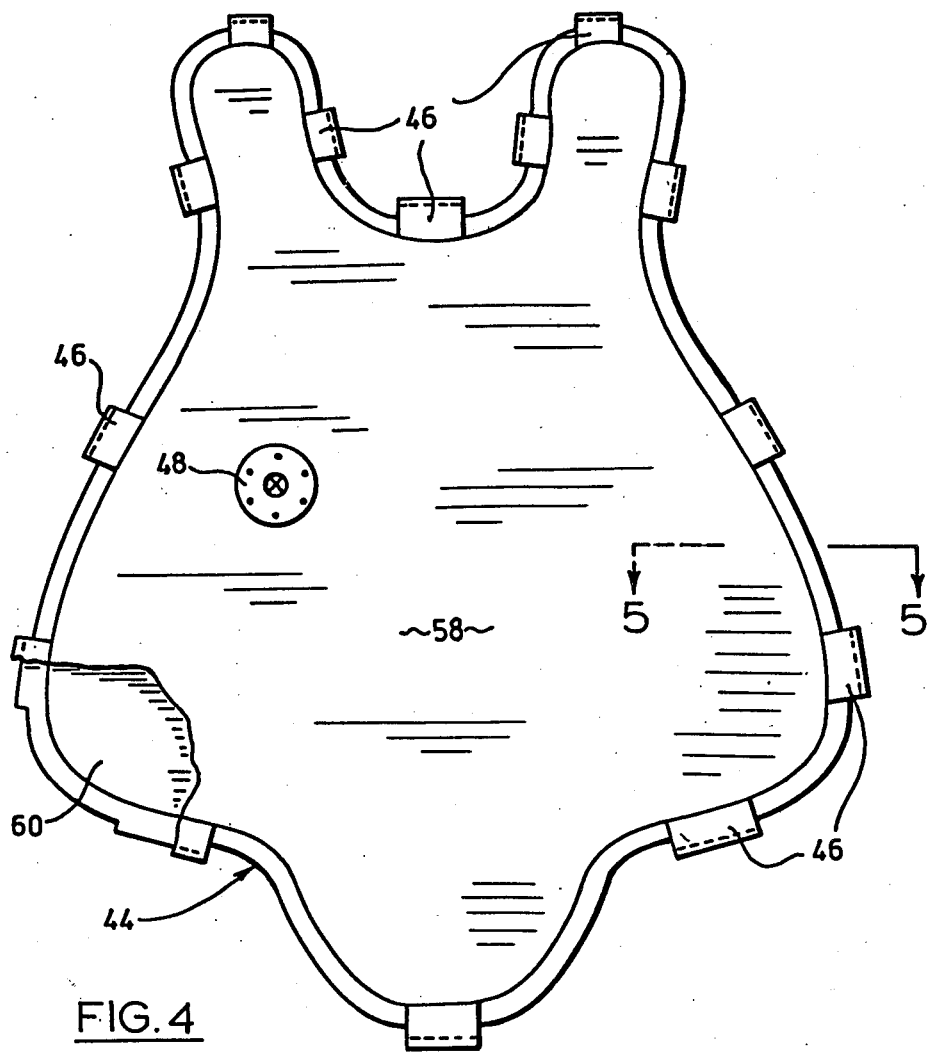
FIG. 4 is an enlarged view of a bladder used in the proposed partial pressure jerkin of FIGS. 1 to 3.

Referring now to the drawings, the proposed partial pressure jerkin 10 comprises an outer garment 12 which is made from a front panel 20 and a rear panel 22 joined along side seams 24. A head aperture 26 and a pair of arm apertures 28 are cut into the outer garment 12 with the front and rear panels 20, 22 being joined by shoulder seams 30. Similarly, leg apertures 32 are cut in the lower portion of the outer garment 12 with the front and rear panels being joined at a crotch seam 34. The outer garment 12 therefore encompasses the torso T of the wearer W.

Adjustment of the garment 12 is provided by two side laces 36, 38 in the area of the side seams 24 and a rear lace 40 which extends centrally down the rear panel 22. By adjustment of the laces 36, 38 and 40 the garment 12 may be fitted to suit an individual wearer.

The outer garment 12 is lined by a bloused lining 42 which is sown to the outer garment along the edges of the head, arm and leg apertures. A bladder 44 is positioned between the lining 42 and the front panel 20 of the outer garment 12. The bladder 44 includes a number of tabs 46 which permit the bladder to be sown into the front panel 20. A connector 48 is attached to the bladder 44 and passes through a hole 50 cut in the front panel 20. A sealing plate 52 is secured to the connector 48 by screws 54 to hold the connector 48 in the desired location.

Figure 5:
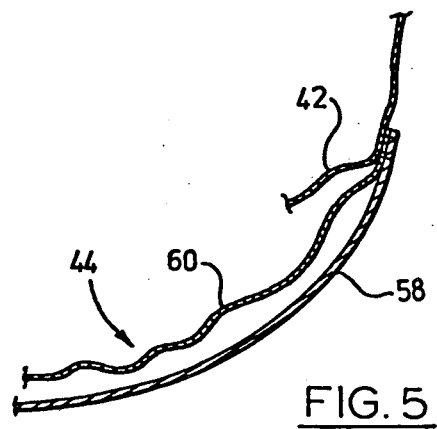
FIG. 5 is a view on the line 5—5 of FIG. 4.

The bladder 44 extends over the front panel 20 to cover the upper thighs, the inguinal areas and the anterior portion of the chest of the wearer. A pair of lateral extensions 56 passes across the shoulder of the outer garment 12 between the head and arm apertures 26, 28 and down the rear panel into the region of the shoulder blade of the wearer. As can best be seen in FIG. 5, the bladder 44 is formed from an outer skin 58 and an inner skin 60 which are sealed along their peripheral edges 62. The outer skin 58 is made from polyurethane coated nylon known as Texmade and is comparatively unstretchable. The inner skin 60 is made from material sold under the trade name "Tuftane" and available from Kenyon Industries, Kenyon, Rhode Island. The modular of elasticity of "Tuftane" is lower then that of "Texmade" so that the inner skin 60 exhibits a greater degree of stretch than the outer skin 58. The bladder 44 is located in the partial pressure jerkin 10 with the outer skin 58 adjacent to the outer garment 12 and the inner skin 60 adjacent to the lining 42. The connector 48 is sealed to the outer skin 58 over an aperture 62 so that admission of pressurised fluid through the connector will inflate the bladder 44.

An opening 64 is provided in the rear panel 22 from the head aperture 26 to one of the leg apertures 32. The opening 64 passes between the lateral extensions 56 and to one side of the rear lace 40. A separable zip fastener 66 is sown along the edges of the opening so that the opening 64 may be held in a closed position. With the zip fastener undone and separated the partial pressure jerkin is open along the rear panel 22 to permit the wearer to put one leg through the aperture 32 and his arms through the apertures 28. The fastener 66 may then be closed to seal the aperture 32 around the other leg and the head aperture 26 around the neck.

Upon initial wearing of the partial pressure jerkin 10, the laces 36, 38, 40 are adjusted to achieve a snug comfortable fit. Thereafter, the laces need no further adjustment to fit on initial wearing of the partial pressure jerkin 10, the laces 36, 38, 40 are adjusted to achieve a snug comfortable fit. Thereafter, the laces need no further adjustment to fit the wearer and the fastener 66 enables the donning and duffing of the partial pressure jerkin 12.

The partial pressure jerkin 12 is normally worn with a pair of anti-G pants (not shown) and the connector 48 is attached to one of the outlets of the dilution demand regulator of the oxygen breathing system of the aircraft. When the regulator senses the need for pressure breathing at high altitude, it automatically delivers 100% oxygen at the required positive pressure to the oronasal mask and to the bladder 44 to inflate it, thereby supporting the chest and torso. The stretchier inner skin 50 allows the bladder to conform to the contours of the anterior portion of the torso without ballooning of the outer garment and the lateral extensions 56 provide support for the apexes of the lungs situated underneath the soft region just above the collarbone and adjacent to the side of the neck.

Figure 6:
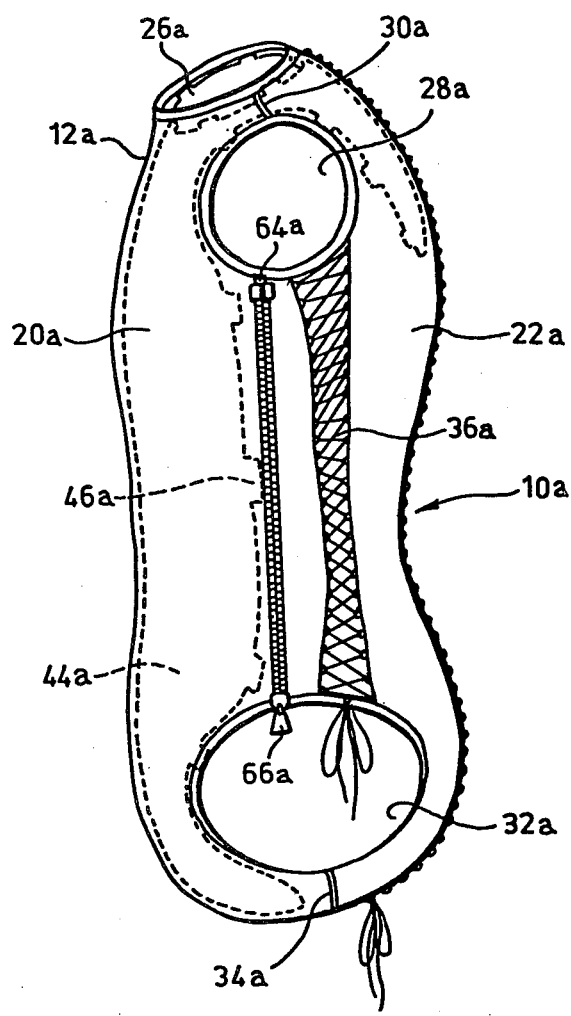
FIG. 6 is a side elevation of a further embodiment of a pressure breathing jerkin.
Figure 7:
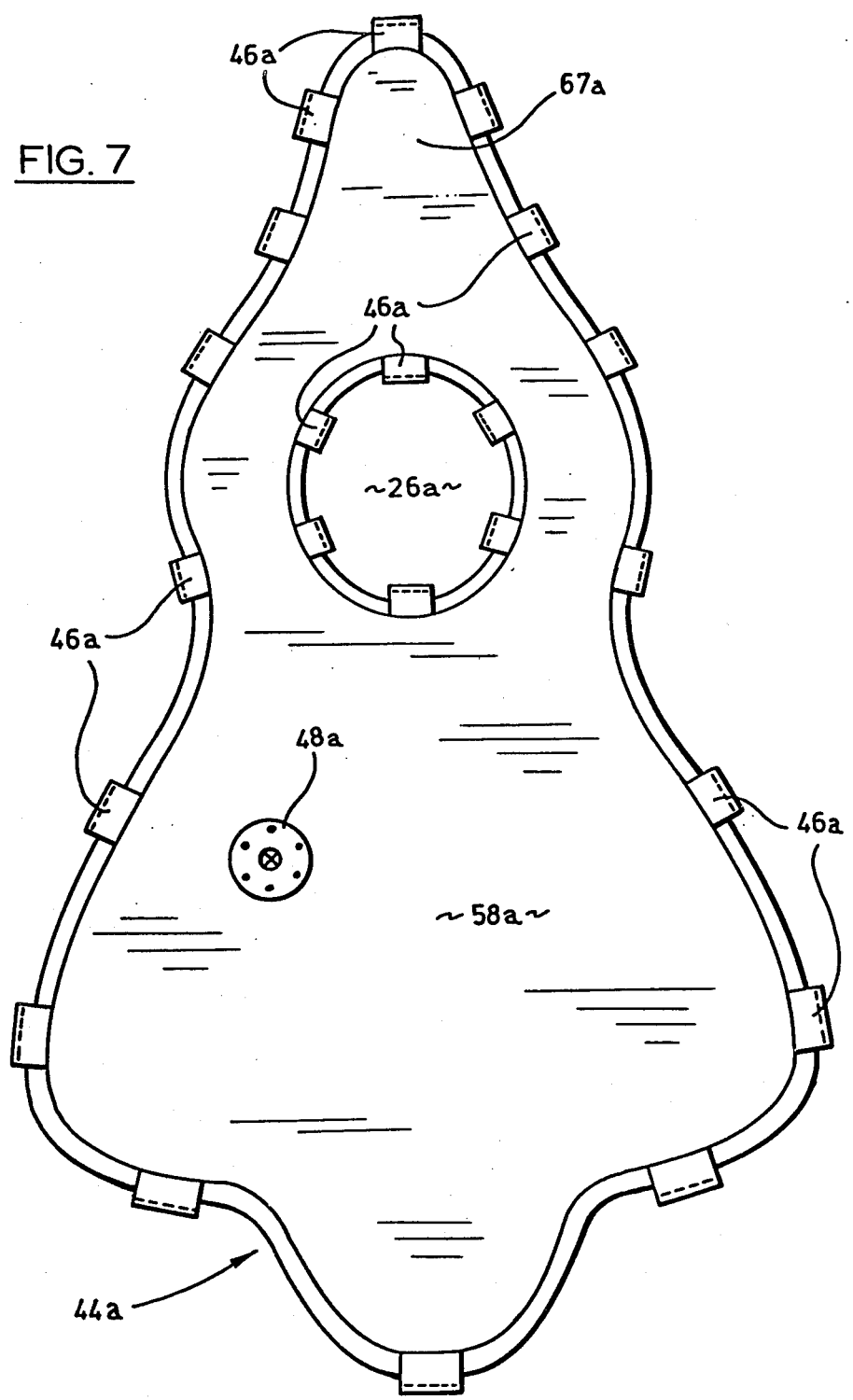
FIG. 7 is a view of the bladder used in the embodiment of FIG. 6.

It will also be appreciated that the location of the fastener 66 in the rear panel enables the bladder 44 to extend without interruption across the chest cavity and thereby provide an uniform support in the most critical area. If preferred, the opening may be located at the side seam 24 as shown in the embodiment of FIG. 6. This method of fastening will still permit the use of an uninterrupted bladder, as shown in the embodiments of FIGS. 6 and 7. In this embodiment, like reference numerals denote like components with a suffix 'a' added for clarity.

In this embodiment, an opening 64a is provided in the side of the rear panel 22a of the partial pressure jerkin 10a in front of the lace 36a rather than in the back of the rear panel 22. The opening 64a extends from one of the arm aperture 28a to one of the leg aperture 32a of the same side of the rear panel 22a. A separable zip fastener 66a is sewn along the edges of the opening so that the opening 64a may be held in a closed position. With the zip fastener 66a undone and separated, the partial pressure jerkin is open along the rear panel 22 to allow the wearer to put one leg through the aperture 32, one of his arms through one of the aperture 28 and his head through the aperture 26. The fastener 66 may then be closed to seal the other arm aperture 28 and the other leg aperture 32.

This configuration also permits the lateral extensions 56a to be connected by a connecting member 67a that extends between the shoulder blades and terminates approximately 5 centimeters below the shoulder blades of the wearer.

Figure 8:
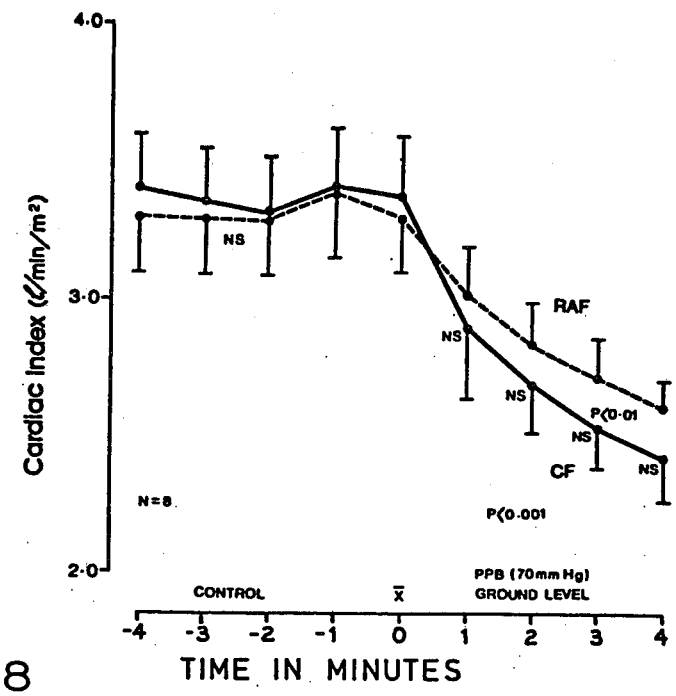
FIGS. 8, 9 and 10 are comparative curves showing performance characteristics of the proposed partial pressure jerkin of FIG. 1 and a prior art jerkin.

The comparative performance between the prior full bladder jerkin and that described above is shown in FIGS. 8 to 10. FIG. 8 is a curve of Cardiac Index v. time for a test conducted at ground level. The cardiac index is a measure of the volume of blood delivered to the body of the heart per minute.

Ideally, this important cardiovascular parameter should remain constant before and after the onset of pressure breathing. FIG. 8 shows that a decrease in the cardiac index occurred with both partial pressure jerkins when breathing against a positive pressure of 70 mm Hg at ground level, and that the fall in the cardiac index was only slightly more pronounced with the partial pressure jerkin just described above with reference to FIGS. 1 to 5.

Figure 10:
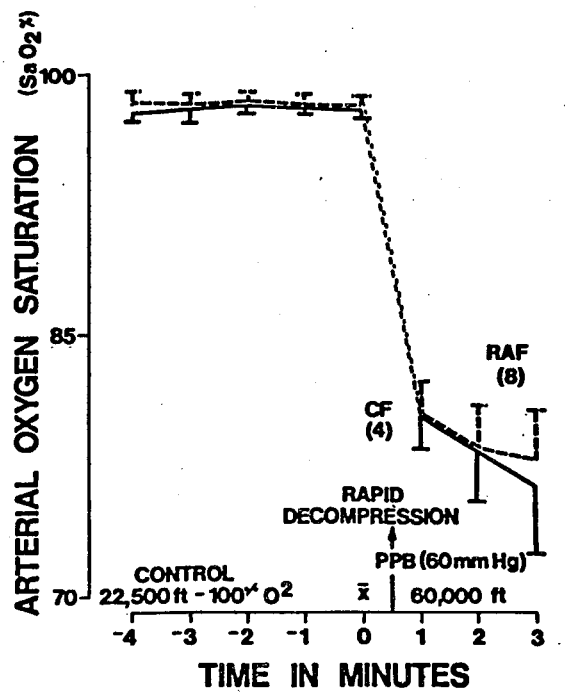
Figure 9:
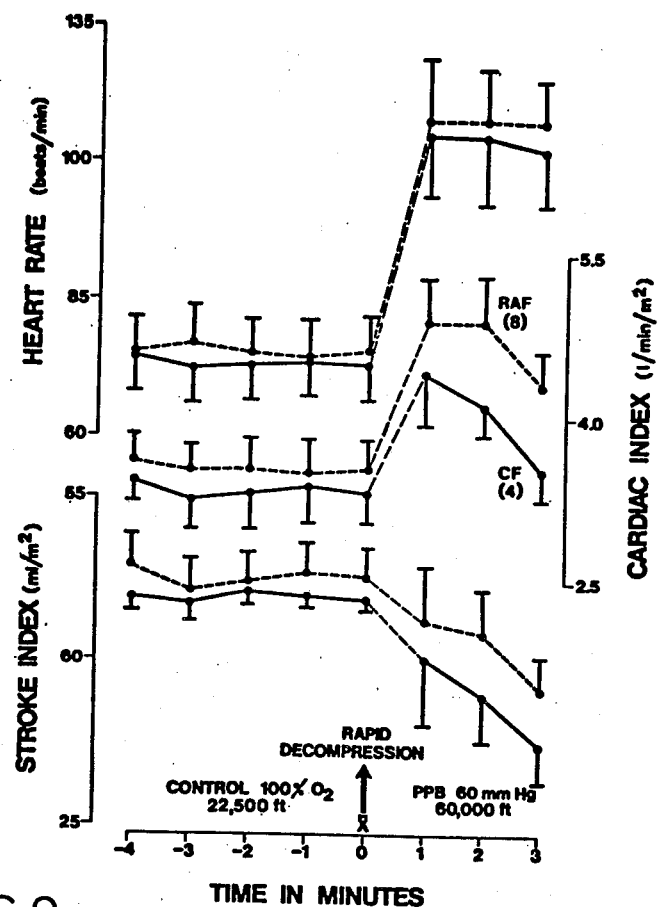

On the other hand, FIG. 9 illustrates that an increase in the cardiac index was found with both partial pressure jerkins, when the test was repeated at a simulated altitude of 60,000 feet. The protection afforded by the partial pressure jerkins is considered satisfactory and equivalent if an increase instead of a decrease in the cardiac index is observed during positive pressure breathing. It can be seen in FIG. 9 that the present partial pressure jerkin provided such an increase in the cardiac index for an extended period of time (i.e. greater than three minutes) when breathing against a positive pressure of 60 mm Hg at a simulated altitude of 60,000 feet, after a rapid decompression from 22,500 feet. The curves in FIG. 10 represent the changes that happened in the oxygen saturation of the arterial blood of eight subjects during a three minute exposure to a simulated altitude of 60,000 feet, after a rapid decompression from 22,500 feet. In this regard, the protection is considered acceptable if the arterial oxygen saturation is maintained above 60% during the entire duration of the exposure at high altitudes. Therefore, the performances of both partial pressure jerkins are considered similar and satisfactory.

There are no results available for a direct comparison between the diaphragm bladder partial pressure jerkin and the present partial pressure jerkin but data presented in a paper entitled "Protection Against the Physiological Effects of Positive Pressure Breathing", and published in Aviation Space and Environmental Medicine, volume 49, number 6, June 1978, provide a comparison between the full bladder partial pressure jerkin and the diaphragm bladder partial pressure jerkin. These are separately designed R and S in the results section of this paper and considerable differences in performance were found.

Therefore, the present partial pressure jerkin provides a degree of protection against the adverse cardiovascular effects induced by high levels of positive pressure breathing comparable to that of the full bladder partial pressure jerkin, but without the encumberance, thermal load, weight and other disadvantages associated with it.

The embodiments of the invention in which an exclusive property of privilege is claimed are defined as follows:

1. A partial pressure jerkin comprising an outer garment having a front panel to overlie the chest of torso, a rear panel connected to said front panel and arranged to overlie the spine and back of a torso, head and arm apertures formed in said garment between said front and rear panels, a bladder located within said garment and overlying at least a portion of said front panel, connection means to connect said bladder to a pressurised source, an opening in said rear panel to permit said garment to be placed on said torso and fastening means to secure said opening whereby said bladder may extend in uninterrupted manner across said front panel.

2. A partial pressure jerkin according to claim 1 wherein said outer garment further includes a pair of leg apertures and said opening extends from said head aperture to one of said leg apertures.

3. A partial pressure jerkin according to claim 1 wherein said opening extends along the junction of said rear and front panels.

4. A partial pressure jerkin according to claim 2 wherein said bladder includes a pair of lateral extensions each of which extends across a respective shoulder area of said garment located between said head aperture and an arm aperture, and terminates in the proximity of the shoulder blade of the torso, said opening passing between said lateral extensions.

5. A partial pressure jerkin according to any one of claims 1, 2 or 4 wherein adjustment means are provided to adjust said garment to said torso.

6. A partial pressure jerkin according to claim 1, 2 or 4 wherein said fastening means is a separable zip fastener.

7. A partial pressure jerkin comprising an outer garment to encompass the torso of a wearer and including head and arm apertures, an inflatable bladder located within said garment and connection means to connect said bladder to a source of pressurised fluid to inflate said bladder and exert a compressive force on said torso, said bladder being located within said garment to overlie the front of said torso, said bladder having a pair of lateral extensions extending across a shoulder portion between said head and arm apertures and terminating in the proximity of the shoulder blade of said torso.

8. A partial pressure jerkin according to claim 7 wherein said garment includes a pair of leg apertures and said bladder extends to the periphery of said leg appertures including the inguinal area.

9. A partial pressure jerkin according to claim 8 wherein said bladder extends continuously across the chest region of said torso.

10. For use in a partial pressure jerkin including an outer garment to encompass a torso, an inflatable bladder for location between said garment and said torso to exert a compressive force on said torso upon inflation, said bladder including an outer skin engageable with said garment, and an inner skin engageable with said torso, said inner and outer skins being sealed to one another along their peripheral edges, and inlet means to permit ingress of pressurised fluid between said skins, said inner skin having a lower modulus of elasticity than said outer skin whereby, upon inflation of said bladder, said inner skin stretches to conform to said torso and provide uniform support thereto.

11. A bladder according to claim 10 wherein said outer skin is formed from polyurethane coated nylon.

12. A bladder according to claim 10 or 11 wherein said inner skin is formed from "Tuftane".

13. A bladder according to claim 10 wherein said inlet means is fastened to said outer skin.

14. A bladder according to any one of claims 10, 11, or 13 including tabs formed on the periphery of said skins to permit attachment of said bladder to said garment.

* * * * *